United States Patent [19]

Schollmeier

[11] 4,013,980
[45] Mar. 22, 1977

[54] EQUALIZER FOR PARTIAL RESPONSE SIGNALS

[75] Inventor: Gero Schollmeier, Gauting, Germany

[73] Assignee: Siemens Aktiengesellschaft, Munich, Germany

[22] Filed: June 26, 1975

[21] Appl. No.: 590,507

Related U.S. Application Data

[63] Continuation-in-part of Ser. No. 560,320, March 20, 1975, abandoned, which is a continuation of Ser. No. 419,092, Nov. 26, 1973, abandoned.

[30] Foreign Application Priority Data

Jan. 5, 1973 Germany .......................... 2300480

[52] U.S. Cl. .................................. 333/18; 325/42; 333/28 R
[51] Int. Cl.² ...................... H04B 3/04; H03H 7/16
[58] Field of Search ........... 333/18, 28 R; 328/162, 328/165; 325/42, 323

[56] References Cited

UNITED STATES PATENTS

| 3,755,738 | 8/1975 | Gitlin et al. | 333/18 X |
| 3,764,914 | 10/1973 | Karnaugh | 333/18 X |

Primary Examiner—Paul L. Gensler
Attorney, Agent, or Firm—Gerald L. Lett

[57] ABSTRACT

An equalizer for partial response signals is described which is constituted by a shift register and an analog adder, from the output of which a corrected signal is produced. Two of the switching stages forming the shift register have their outputs connected to inputs of an additional analog adder, and one of these shift register stage outputs is connected to the analog adder over an adjustable amplifier. The output of the additional analog adder is connected to a correlator, the value of the output signal of which controls the gain of the adjustable amplifier.

6 Claims, 3 Drawing Figures

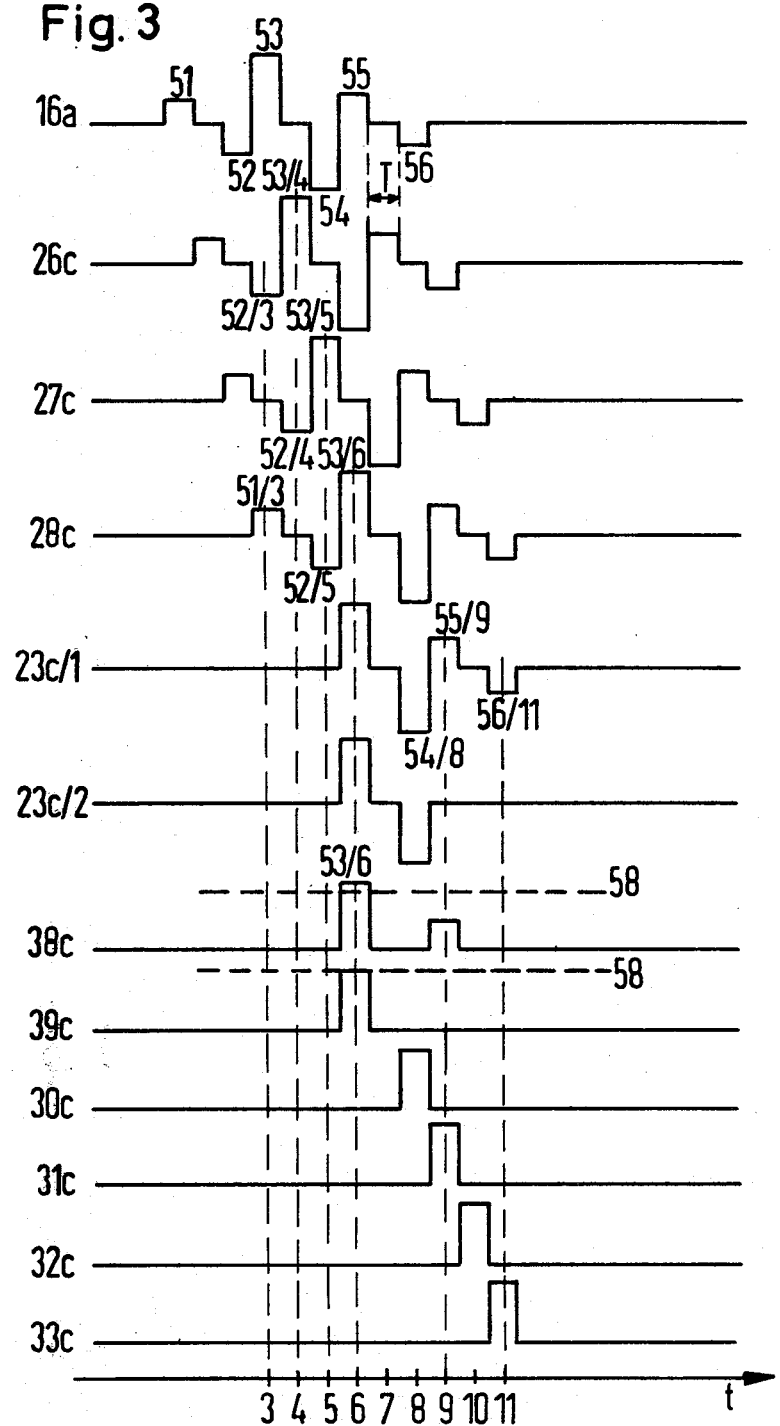

EQUALIZER FOR PARTIAL RESPONSE SIGNALS

BACKGROUND OF THE INVENTION

This is a continuation-in-part of U.S. application Ser. No. 560,320, filed Mar. 20, 1975 which is a continuation of U.S. application Ser. No. 419,092, filed Nov. 26, 1973, both of the aforementioned applications are now abandoned.

The invention relates to an equalizer for partial response signals of the type comprising a plurality of stages of a shift register and an analog adder from the output of which the corrected signal is transmitted.

Prior art adaptive equalizers for partial response signals have the disadvantage that they converge only slowly toward their optimal adjustment or require intricate orthogonalization networks due to the absence of orthogonality of successive partial response signals.

It is, therefore, an object of the invention to overcome these disadvantages and to provide an adaptive equalizer adjusting rapidly to its optimal position and enabling a simple implementation thereof.

SUMMARY OF THE INVENTION

In accordance with the principles of the invention, in an equalizer of the type described hereinabove two of the stages are connected via their outputs to inputs of an additional analog adder. One of these outputs is, as well, connected via an adjustable amplifier to the analog adder. To do this, the output of the additional analog adder is connected to a correlator, the output signal of which acts to change the gain of the adjustable amplifier.

The adaptive equalizer according to the invention is characterized by the fact that it requires little expenditure for circuitry and causes a rapid correction of the preshoot.

If a fast correction of overshoot is also desired, it is convenient to interpose a second analog adder in the transmission path between the output of the analog adder and the first stage of an additional shift register. The output of the analog adder is connected to an input of a second analog adder, and the output of one of the stages of the additional shift register is connected to a second input of the second analog adder. The output of the second analog adder is connected indirectly or directly to the first stage of the additional shift register.

BRIEF DESCRIPTION OF THE DRAWINGS

The principles of the invention will be more readily understood by reference to the description of a preferred embodiment given hereinbelow in conjunction with the three-figure drawing, wherein like reference characters designate like or corresponding parts.

FIG. 3 is a time-waveform diagram illustrating the operation of the equalizer.

DETAILED DESCRIPTION OF THE DRAWINGS

Figure 1:
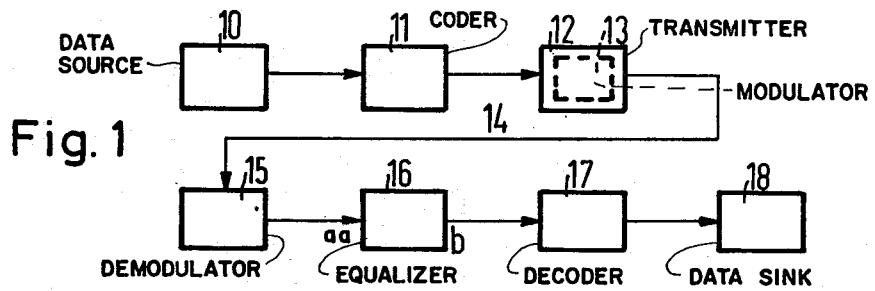
FIG. 1 is a block diagram of a data transmission system using partial responses and containing the equalizer of the invention.

The data transmission system shown in FIG. 1 comprises data source 10, coder 11, the transmitter 12 with the modulator 13, transmission path 14, demodulator 15, equalizer 16, decoder 17, and data sink 18.

Digital signals, more particularly binary signals, are transmitted from the data source 10. For example, a conventional teleprinter may be provided as a data source 10.

By means of the coder 11, also a prior art device, partial response pulses are allocated to the signals transmitted from the data source 10. More particularly, class IV partial response pulses can be assigned to the signals. A multistage signal is transmitted via the output of the coder 11. By way of example, the binary signals coupled to the coder 11 can be processed such that a three-stage signal is transmitted via the output of the coder 11.

A carrier with the signal supplied by the coder 11 is modulated by means of transmitter 12 with modulator 13, so that the frequency is converted, and a modulated signal is transmitted via the output of the transmitter 12. The transmitted signal occupies a frequency range of about 300 Hz. to 3400 Hz. The modulated signal is transmitted over transmission path 14, for example, a telephone circuit may be provided as a transmission path.

The transmitted signal is demodulated in the demodulator 15 so that a signal is transmitted from the output thereof which is similar to the signal that has been routed to the transmitter 12 at the sending station. The signal transmitted from the output of the demodulator 15 is, however, distorted in comparison with the signal routed to the transmitter 12. Such distortions are essentially cuased by the transmission path 14.

It is the task of the equalizer 16 to reduce the distortions of the routed signal so that the signal transmitted from the output of the equalizer 16 is more similar to the signal supplied to the transmitter 12.

The decoding caused by means of the decoder 17 cancels the coding brought about by the coder 11, so that a signal is transmitted from the output of the decoder 17 which is substantially similar to the signal of the data source. This signal is routed to the data sink 18. By way of example, a teleprinter may be provided as a data sink.

Figure 2:
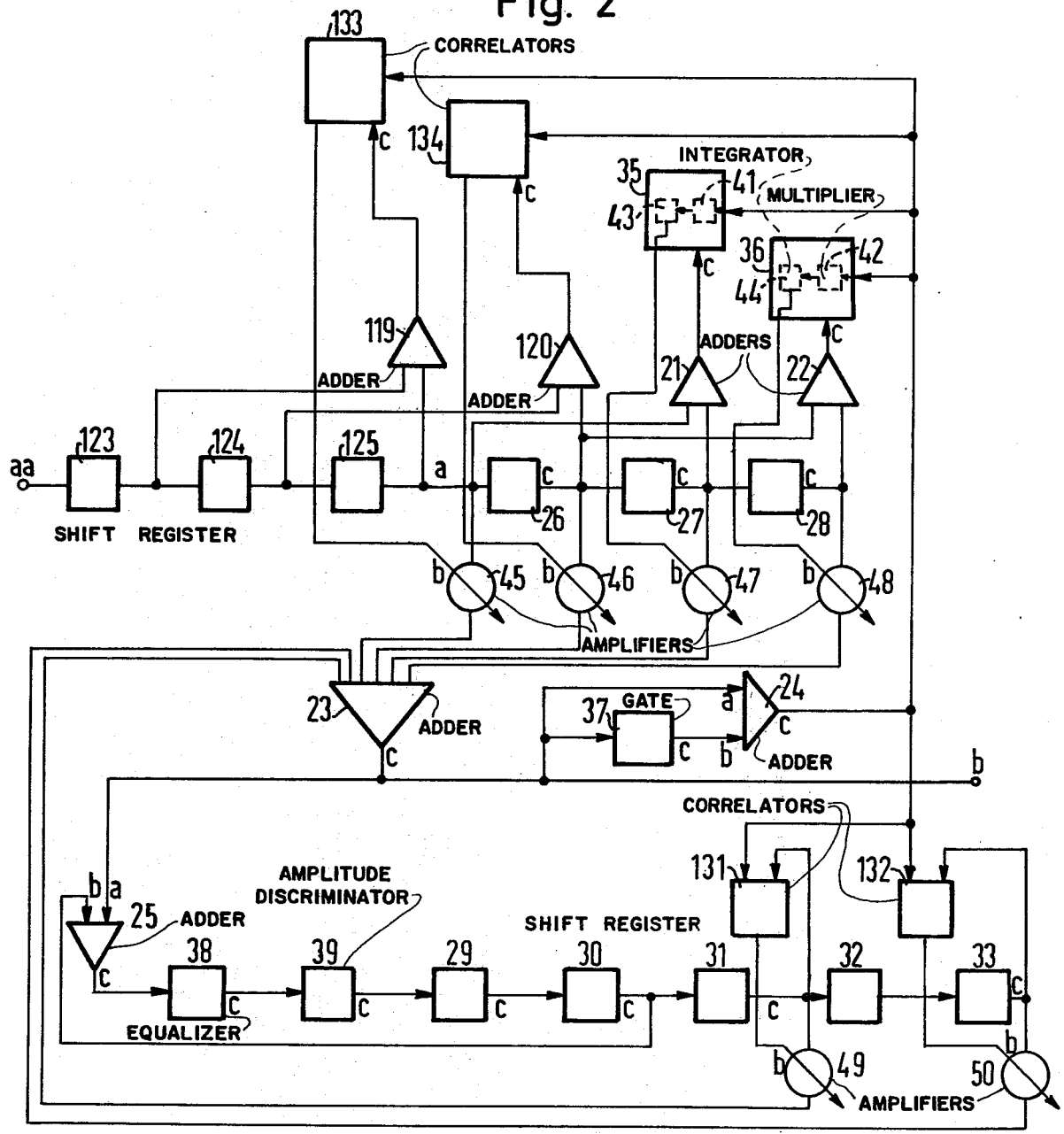
FIG. 2 is a more detailed illustration of a preferred embodiment of the equalizer of the invention.

FIG. 2 gives a more detailed presentation of the equalizer 16 shown schematically in FIG. 1. It comprises the analog adders 119, 120, 21, 22, 23, 24, 25, switching stages 123, 124, 125, 26, 27, 28, 29, 30, 31, 32, 33, constituting a shift register, correlators 35, 36, 131, 132, 133, 134, nominal-frequency gate 37, rectifier 38, amplitude discriminator 39 and the amplifiers 45, 46, 47, 48, 49, 50.

The signal to be corrected is routed over the input aa to the binary stages 123, 124, 125, 26 to 28 forming a shift register. The shift register may be designed in the manner of an analog shift register or in the manner of a digital shift register. It is assumed that an analog or a digital signal is supplied over the input aa, depending on the construction of the shift register. The operation of the shift register is presumed to be known and is not fully discussed. In the interest of clarity, only six stages are shown, while in practice a greater number of stages may be provided.

The outputs 27c or 28c are connected to the amplifiers 47 to 48. Control signals are supplied to amplifiers 47, 48 over the input b and the gains of the amplifiers are regulated such that the signals are either amplified or attenuated. The amplifiers 45, 46, 49, 50 are similarly regulated. A negative gain can be brought about by the amplifiers, i.e., a gain with a 180° phase shift.

That is, amplifiers 45 and 46 receive input signals from the terminals 26a and 26c, respectively, and, respectively, they receive control signals at their inputs b from correlators 133 and 134. Amplifiers 49 and 50 receive input signals from, respectively, terminals 31c and 33c and the control signals appearing at inputs b are from correlators 131 and 132. Correlators 131–134 are constructed in the same way as correlators 35 and 36, which are discussed in greater detail below. This connected arrangement is known as indicated by U.S. Pat. Nos. 3,715,760 and 3,755,738.

The corrected signal is transmitted over the output of 23c of the analog adder 23 and over the output b of the equalizer 16. The corrected signal is also routed to the nominal frequency gate circuit 37, which transmits a signal over the output 37c. The signal transmitting the desired value of the amplitude stage is currently transmitted. The analog adder 24 operates like a differential stage and transmits an analog signal over the output 24c, which analog signal indicates the respective difference between the amplitude of the corrected signal and the desired value of the amplitude stage. Thus, a signal is transmitted over the output 24c identifying the defect of the corrected signal.

Each of the correlators 35 or 36 comprises a multiplier 41 or 42 and an integrator 43 or 44. The multipliers 41 or 42 generate multiplicative signals corresponding to the product of the signals supplied over the outputs 21c and 24c or 22c and 24c. The multiplicative signals are analog signals assuming several amplitude stages. The analog signals are smoothed in the integrators 43 or 44 and routed to the inputs b of the amplifiers 47 or 48 as control signals. In this way the mean quadratic distortion is held to a minimum.

The preshoot of the signal routed over the input is corrected by means of the correlators 35, 36, the analog adders 21 to 24, the stages 26, 27, 28 and the amplifiers 47, 48.

The overshoot is corrected through analog adder 25, equalizer 38, amplitude discriminator 39, shift register stages 29, 30, 31, 32, 33, and the amplifiers 49, 50. A signal is routed to the amplitude discriminator 39, which signal is capable of assuming several amplitude stages. The amplitude discriminator 39 transmits a signal corresponding to the desired values of the amplitude stages as a function of the amplitude stages.

The stages 29, 30, 31, 32, 33 form a shift register the operation of which is likewise presumed to be known in itself. In the interest of clarity, only five stages are shown, whereas in practice a greater number of such stages may be provided. The amplifiers 49, 50 enable a transmission gain or an attenuation of the fed signal as a function of a control signal which is routed over the input b.

FIG. 3 is a time-waveform diagram illustrating some signals with which the mode of operation of the equalizer 16 shown in FIG. 2 will be explained hereinbelow. The signals have the same reference symbols as the switching points over which they are transmitted. By way of example, the signal in FIG. 3 transmitted over the output 26c shown in FIG. 2 is labeled 26c. Units of time t are plotted in the direction of abscissa and the pulse amplitudes in the direction of the ordinate.

The signal 16a is a distorted partial response signal consisting of pulses 51, 52, 53, 54, 55, 56. The pulses 51 and 52 form the preshoots, the pulse 53 forms the positive principal value, the pulse 54 the negative principal value, and the pulses 55 and 56 the overshoots.

The signal 16a is delayed by one clock cycle T through the stage 26; this results in the signal 26c. The stages 26 or 28 cause delays of one clock cycle; this results in the corresponding signals 27c or 28c. The signals 27c or 28c are routed to the amplifiers 47 or 48. The gain of the amplifier 48 is adjusted in accordance with the following equation:

$$C48(t) = C48(t-1) - d \cdot e(S28c + S26c).$$

wherein:
$C48(t)$ is the gain of the amplifier 48 at the instant $t$, $C48(t-1)$ is the gain of the amplifier 48 at the instant $t-1$, $d$ is the proportional control action factor, $e$ is the amplitude difference between the corrected signal present as actual value at the output 23c and the desired value of said signal. Thus, the reference symbol $e$ also indicates the error of the signal transmitted over the output 23c, $S28c$ is the amplitude of the signal at the output 28c at the instant $t$, $S26c$ is the amplitude of the signal at the output 26c at the instant $t$.

With respect to the mode of operation of the equalizer 16 shown in FIG. 2, it is first of all assumed that the gain C47 equals 0 and that no signal is routed to the analog adder 23 over the output of the amplifier 47. It is also assumed that no error signal is transmitted over the output 24c and that the gain C48 equals 1. The amplifier 48 thus causes neither a gain nor an attenuation of the signal routed over the output 28c. The signal is routed to the analog adder 23 and the output signal thereof is redirected to the input $a$ of the analog adder 24 and, to nominal frequency selector 37.

At the instant $t = 6$, the error signal is transmitted to the correlators 35 and 36 over the output 24c, by means of the nominal frequency selector 37 and the analog adder 24. The error signal $e$ identifies the deviation of the pulse 53/6 from the desired value.

Control signals are derived as a function of the error signal by means or the correlators 35 or 36 and supplied to the amplifiers 47 or 48 so that their gains are adjusted in accordance with the above equation. Furthermore, signals are redirected to and added in the analog adder 23 from the outputs of the two amplifiers 47 and 48.

At the instant $t=5$, the preshoot 52/5 is suppressed, because the C47 is adjusted such that the pulses 52/5, 53/5 compensate each other.

At the instant $t=4$, the gain C46 of the amplifier 46 is so adjusted that the pulses 52/4 and 53/4 compensate each other.

At the instant $t=3$, the preshoot 51/3 is suppressed, because the gain C45 of the amplifier 45 is so adjusted that the pulses 51/3 and 52/3 compensate each other. If the analog adder 22 were not provided and the signal were routed from the output 28c directly to the multiplier 42, the pulse 52/3 would not be taken into account during the generation of the control signals (in the correlator 36). Hence, the pulse 52/3 would cause a preshoot of the signal 28c, even if the pulse 51/3 would be eliminated in another way. Thus, due to the analog adder 22, the pulses 51/3 and 52/3 are eliminated simultaneously.

After the preshoot has been corrected the signal 23c/1 is transmitted from the output 23c. Contrary to the signal 16a supplied at the start, it has no preshoots 51 and 52.

To correct the overshoots the signal 23c/1 is transmitted to the rectifier 38 over input $a$ of the analog adder 25. The rectifier 38 suppresses the negative pulses 54/8 and 56/11, which results in the signal 38c.

In the amplitude discriminator 39 it is verified if the signal 38c contains a pulse whose amplitude approximates the desired value 58. In the present example, the amplitude of the pulse 53/6 approximates the desired value 58 so that the signal 39c is transmitted over the amplitude discriminator 39.

The stages 29 and 30 delay the signal 39c by two clock cycles so that a signal 30 delayed by two clock cycles is transmitted to the input b of the analog adder over the output 30c.

Thus, at the instant $t=8$, the signals 23c/1 and 30c are applied to both inputs a and b of the analog adder 25. In the course of the addition the pulse 54/8 is eliminated through the analog adder 25 and the signal 30c.

By means of the stage 31 the signal is delayed by one clock cycle, which results in the signal 31c, which is routed to the amplifier 49. The gain of the amplifier 49 is so adjusted over the input b that the pulses 55/9 and 31c are eliminated through the analog adder 23, thereby eliminating the first overshoot 55/9.

The signal 31c is delayed through the stages 32 or 33, which results in the signals 32c or 33c. The amplification factor of the amplifier 50 is so adjusted that also the second overshoot, viz. the pulse 56/11 is eliminated. After the elimination of the two overshoots 55/9 and 56/11 the signal 23c/2 is finally transmitted over the output of the analog adder 23, which signal represents an undistorted partial response signal. The rectifier 38 eliminates negative pulses even if this is not caused by the signal routed over the input 25b.

The description of a preferred embodiment of the invention given hereinabove is only exemplary of the principles of the invention and does not define the scope of the invention. The scope of the invention is defined by the appended claims.

I claim:

1. In an equalizer for partial response signals comprising a multi-stage shift register coupled to a first analog adder, a corrected signal being produced from the output of said first analog adder, the improvement comprising;
   second analog adder means having inputs connected to outputs of at least two of the stages of said shift register,
   amplifier means including means for adjusting the gain thereof responsive to the value of the control signal coupled thereto, one of said outputs of said two stages of said shift register being connected to an input of said amplifier means and from an output thereof to an input of said first analog adder,
   correlator means for producing said control signal which is coupled to said amplifier means and having an input connected to an output of said second analog adder means.

2. The equalizer defined in claim 1 further comprising:
   additional multi-stage shift register,
   third analog adder means interposed in a transmission path between the output of said first analog adder and an input to the first stage of said additional shift register means, the output of one of the stages of said additional shift register being connected to another input of said third analog adder means, the output of said third analog adder means being connected to the input of said first stage of said additional amplifier means.

3. The equalizer defined in claim 2 further comprising:
   fourth analog adder means having a first input connected to the output of said first analog adder, and
   gate means having an input connected to the output of said first analog adder and an output connected to a second input of said fourth analog adder means.

4. The equalizer defined in claim 2 further comprising:
   additional amplifier means having gain adjusting means operable responsive to the value of an adjusting signal applied thereto, and wherein:
   an output of one of said stages of said additional shift register means is connected to an additional input of said first analog adder through said additional amplifier means.

5. The equalizer defined in claim 2 further comprising:
   amplitude discriminator means having an input connected to the output of said third analog adder and an output connected to the input of said first stage of said additional shift register means.

6. The equalizer defined in claim 2 wherein between said first stage of said additional shift register and the stage thereof connected to said third analog adder there are disposed as many stages of said additional shift register as between the stages of said shift register connected to said second analog adder.

* * * * *